United States Patent
Sugano

(10) Patent No.: US 7,392,653 B2
(45) Date of Patent: Jul. 1, 2008

(54) HYDRAULIC CONTROL SYSTEM FOR WORKING MACHINE

(75) Inventor: Naoki Sugano, Kobe (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 123 days.

(21) Appl. No.: 11/077,010

(22) Filed: Mar. 11, 2005

(65) Prior Publication Data

US 2005/0204735 A1    Sep. 22, 2005

(30) Foreign Application Priority Data

Mar. 17, 2004    (JP)    ............................ 2004-075797

(51) Int. Cl.
    *F16D 31/02*    (2006.01)
(52) U.S. Cl. .................................................... 60/452
(58) Field of Classification Search ............... 60/445, 60/452, 468
    See application file for complete search history.

(56) References Cited

U.S. PATENT DOCUMENTS

| | | | | |
|---|---|---|---|---|
| 4,967,557 A | * | 11/1990 | Izumi et al. | 60/452 |
| 5,063,742 A | * | 11/1991 | Yoshimatsu | 60/468 |
| 5,155,996 A | * | 10/1992 | Tatsumi et al. | 60/452 |
| 5,174,114 A | * | 12/1992 | Aoyagi | 60/452 |
| 5,513,551 A | | 5/1996 | Morishita | |
| 5,638,677 A | * | 6/1997 | Hosono et al. | 60/452 |
| 5,743,089 A | * | 4/1998 | Tohji | 60/452 |
| 6,173,573 B1 | * | 1/2001 | Kamada | 60/422 |
| 6,202,411 B1 | | 3/2001 | Yamashita | |

FOREIGN PATENT DOCUMENTS

| | | |
|---|---|---|
| EP | 0 533 958 A1 | 3/1993 |
| JP | 8-219104 | 8/1996 |
| JP | 10-246204 | 9/1998 |
| JP | 2002-38536 | 2/2002 |

* cited by examiner

*Primary Examiner*—F. Daniel Lopez
(74) *Attorney, Agent, or Firm*—Oblon, Spivak, McClelland, Maier & Neustadt, P.C.

(57) ABSTRACT

A hydraulic control system for a working machine according to the present invention comprises a hydraulic pump for supplying working oil to a hydraulic actuator through a control valve, a relief mechanism disposed on the discharge side of the pump, the relief mechanism assuming an open state when a pump discharge pressure which varies according to the pump flow rate exceeds a predetermined pressure and assuming a closed state when the pump discharge pressure becomes the predetermined one or lower, an ordinary control means for controlling the pump flow rate in accordance with working information, and a pressure feedback control means for controlling the pump flow rate in accordance with the pump discharge pressure. In this system, out of controls performed by both control means, control wherein the flow rate by one control becomes smaller than that of the other is selected, thereby opening/closing control of the relief mechanism is performed. According to this, it is possible to decrease the relief loss and improve the energy efficiency while making the most of the ordinary control.

5 Claims, 12 Drawing Sheets

HYDRAULIC CONTROL SYSTEM FOR WORKING MACHINE

BACKGROUND OF THE INVENTION

1. Field of the Invention

The present invention relates to a hydraulic control system for a working machine such as a hydraulic excavator.

2. Description of the Related Art

According to a conventional hydraulic system in a working machine, when a large load is imposed on a hydraulic actuator with a consequent increase in internal pressure of the hydraulic system, working oil is released to a tank through a relief valve to prevent an excessive increase of pressure and thereby prevent a damage to hydraulic devices.

In this case, a large proportion of working oil fed from a hydraulic pump during operation of the relief valve is released directly to a tank through the relief valve without being fed to the hydraulic actuator, so that a large proportion of pump power is consumed as a loss of the relief valve, thus giving a rise to the problem that the energy efficiency is deteriorated.

For example, FIGS. 13A to 13D are explanatory diagrams showing a pressure-flow rate response relation observed when positive control alone is performed. As shown in FIG. 13A, when pilot pressure PI fed from a remote control valve to a control valve is fed stepwise up to FULL by operating an operating lever, a pump flow rate Qp also becomes a maximum flow rate stepwise as in FIG. 13C. However, for example in the case where a hydraulic actuator is a swing motor, the speed of the swing motor does not increase rapidly under the influence of inertia of a swing body. Consequently, an incoming flow rate into a supply-side pipe in the swing motor becomes larger than an outgoing flow rate from the discharge side pipe in the same motor, resulting in that, as shown in FIG. 13B, the internal pressure of the supply pipe, i.e., pump pressure Pp, rises up to relief pressure Pr and, as shown in FIG. 13D, a surplus flow rate of working oil is discharged as relief flow rate Qr from a relief valve.

In Japanese Patent Laid Open No. Hei 8-219104 (Patent Document 1), the positive control is performed so that the higher a pump discharge pressure, the smaller the pump discharge quantity. In Japanese Patent Laid Open No. Hei 10-246204 (Patent Document 2), under a negative control, a throttle is installed on the downstream side of a relief valve, and when the pressure on an upstream side of the throttle increases with an increase of the relief quantity, the pump flow rate is decreased to lower the relief flow rate. Further, in Japanese Patent Laid Open No. 2002-038536 (Patent Document 3), under the negative control, temperatures of working oil on both upstream and downstream sides of the relief valve are detected and when the difference between the temperatures has become large, the pump flow rate is decreased to decrease the relief flow rate.

However, according to the technique disclosed in Patent Document 1 it is impossible to control the pump discharge quantity so as to decrease by an amount matching the relief flow rate. Therefore, if the decrease quantity of the pump discharge quantity is smaller than the amount matching the relief flow rate, the pump discharge pressure exceeds the relief pressure, causing operation of the relief valve, with consequent creation of a large relief flow rate posing the problem that the energy efficiency is deteriorated. If the decrease quantity of the pump discharge pressure is larger than the amount matching the relief flow rate, the relief valve fails to operate and there also arises the problem that the accelerating ability is impaired due to an excessive lowering of the pump discharge pressure.

According to the technique disclosed in Patent Document 2, there occurs a pressure loss due to the throttle provided on the downstream side of the relief valve and hence it is impossible to improve the energy efficiency. According to the technique disclosed in Patent Document 3, heat capacity of the relief valve causes a very large time lag between the creation of relief flow rate and the rise in temperature of the relief valve, so that an excessive time delay occurs from the time when relief flow is created to cut-off of pump flow rate, and thus the relief loss is not fully diminished. Even after the arrival of relief flow rate at zero, the pump flow is cut off for the detection of remaining heat and it becomes impossible to obtain a required driving force.

In case of using only a pressure feedback control instead of positive and negative controls, the control is made for example in such a manner that meter-in opening of a control valve becomes small when the lever operation amount is made small. In this case, in the pressure feedback control, the pump flow rate is not controlled in accordance with the lever operation amount and therefore the pump discharge pressure is always controlled integrally by a high pressure close to the relief pressure. As a result, a differential pressure in a meter-in circuit becomes very high, producing an extremely heavy meter-in loss, whereby the operability is deteriorated. For this reason, the adoption of only the pressure feedback control instead of the ordinary control such as the positive control has not been actually applied.

SUMMARY OF THE INVENTION

It is an object of the present invention to provide a hydraulic control system for a working machine which can decrease a relief loss and improve the energy efficiency while making the most of the ordinary control.

The hydraulic control system for a working machine according to the present invention comprises, as a basic configuration thereof, a hydraulic actuator, a hydraulic pump for supplying working oil to the hydraulic actuator through a control valve, a relief mechanism disposed on the discharge side of the hydraulic pump, the relief mechanism is set an open state in such a manner that the relief mechanism allows a passage of the working oil from the hydraulic pump when a pump discharge pressure of the hydraulic pump which varies according to a pump flow rate in the hydraulic pump exceeds a predetermined pressure and is set a closed state in such a manner that the relief mechanism does not allow the passage when the pump discharge pressure becomes the predetermined pressure or lower, an ordinary control means for controlling the pump flow rate in accordance with working information, a pressure feedback control means for controlling the pump flow rate in accordance with the pump discharge pressure, and a selecting unit for, out of controls performed by both the ordinary control means and the pressure feedback control means, selecting one of the controls, the selected one in which the pump flow rate becomes smaller than that of the other. Opening/closing control for the relief mechanism is performed on the basis of the selection made by the selecting unit.

According to this configuration, the pump flow rate in the hydraulic pump is controlled on the basis of working information by the ordinary control means, the pump flow rate is controlled on the basis of the pump discharge pressure in the hydraulic pump by the pressure feedback control means, and the control wherein the pump flow rate becomes smaller than that of the other is selected out of the controls performed by both those control means, whereby the opening/closing control for the relief mechanism disposed on the discharge side of the hydraulic pump is performed. Thus, the pump discharge quantity can be controlled so as to be decreased by an amount matching the relief flow rate. Consequently, the relief flow rate decreases and so does the relief loss, whereby the energy efficiency is improved. Besides, since the pump discharge pressure is prevented from becoming too low, there is no fear of acceleration performance and driving force being impaired. In the present invention, moreover, the ordinary control is selected when the lever operation amount is made small and therefore the operability is not deteriorated.

DESCRIPTION OF THE PREFERRED EMBODIMENTS

Embodiments of the present invention will be described hereinunder with reference to FIGS. 1 to 12.

First Embodiment

Figure 1:
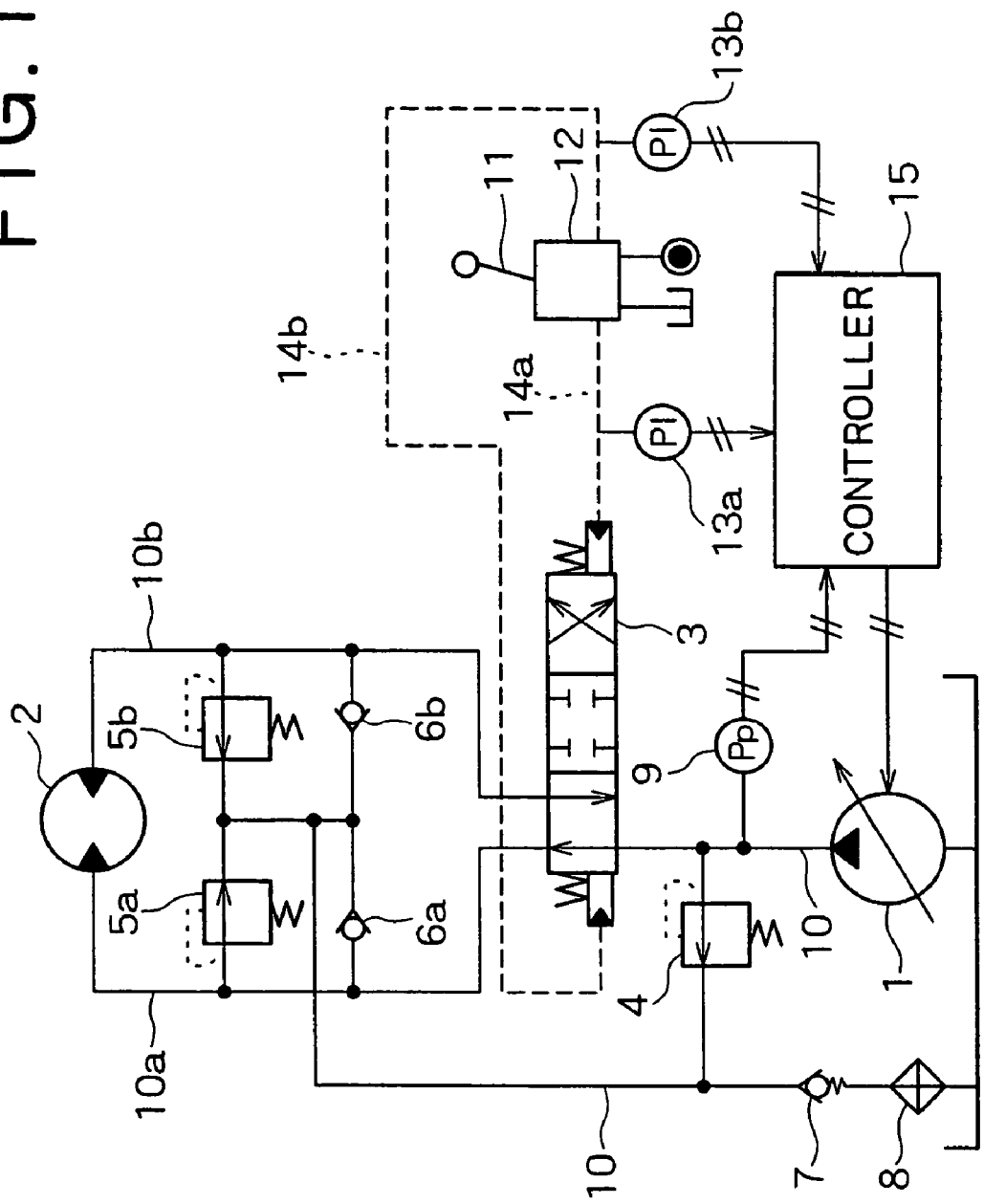
FIG. 1 illustrates a hydraulic control system for a working machine according to a first embodiment of the present invention.
Figure 2:
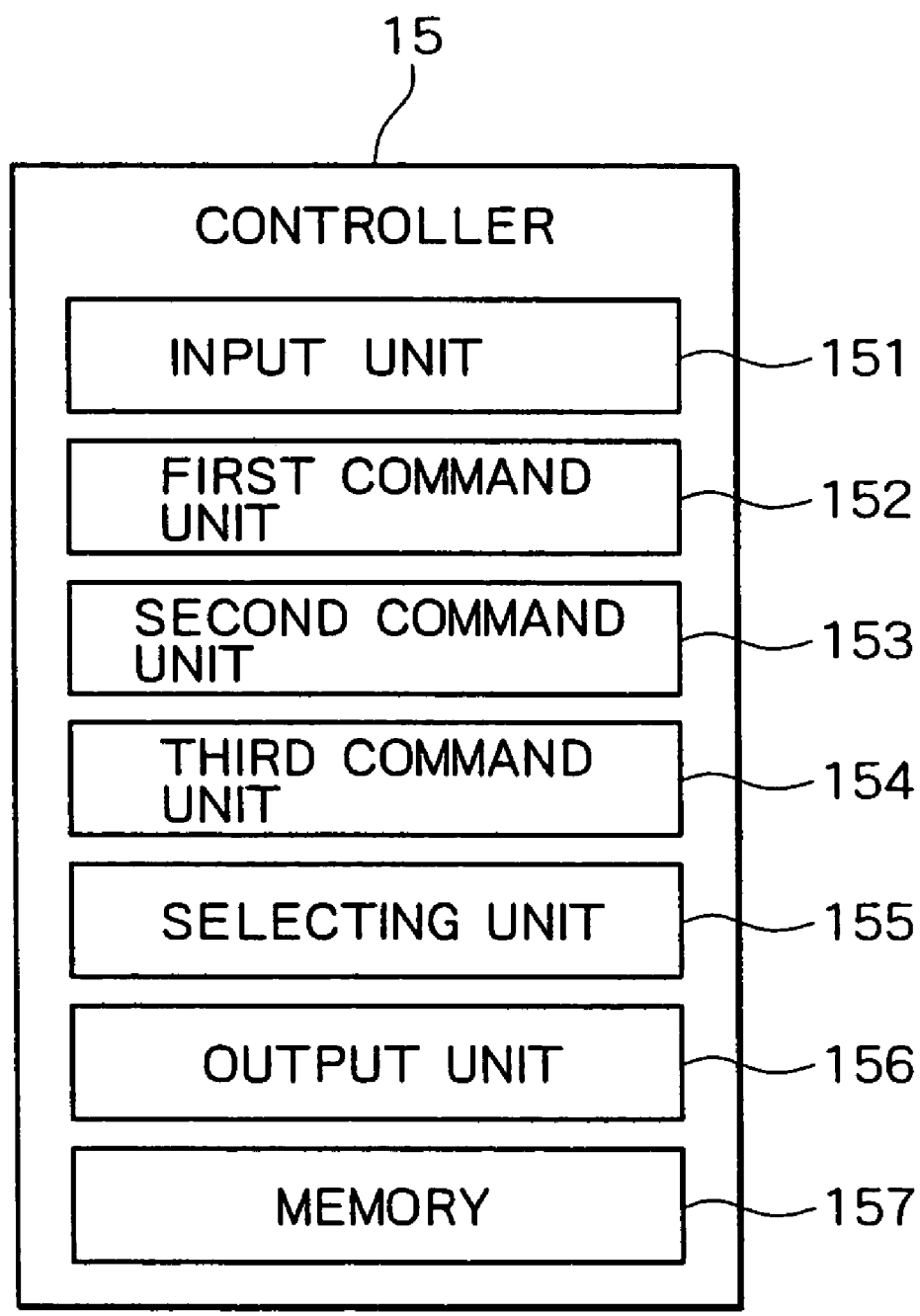
FIG. 2 is a block diagram of a controller according to the present invention.

FIG. 1 illustrates a hydraulic control system for a working machine according to a first embodiment of the present invention and FIG. 2 is a block diagram of a controller.

In FIG. 1, numeral 1 denotes a variable capacity type hydraulic pump, numeral 2 denotes a hydraulic motor as an example of a hydraulic actuator, numeral 3 denotes a control valve for controlling the supply and discharge of working oil to and from the hydraulic motor 2, numeral 4 denotes a main relief valve as an example of a relief mechanism, numerals 5a and 5b denote port relief valves, numerals 6a and 6b denote check valves for make-up, numeral 7 denotes a back pressure check valve, numeral 8 denotes an oil cooler, and numeral 9 denotes a pressure sensor. All of these elements are connected to a main line 10 (10a, 10b). Numeral 11 denotes an operating lever, numeral 12 denotes a remote control valve for generating a pilot pressure in pilot lines 14a and 14b in accordance with a lever operation amount, and numerals 13a and 13b denote pressure sensors for detecting the pilot pressure in pilot line 14a and that in pilot line 14b, respectively, and numeral 15 denotes a controller.

Working oil discharged from the hydraulic pump 1 is fed to the hydraulic motor 2 through the control valve 3 which is adapted to operate with the above pilot pressure. The main relief valve 4 and the pressure sensor 9 are installed in the main line 10 on the discharge side of the hydraulic pump 1. The port relief valves 5a and 5b are installed respectively in the main lines 10a and 10b which are connected to both ports of the hydraulic motor 2. The main relief valve 4 is set an open state in such a manner that the relief valve 4 allows a passage of the working oil from the hydraulic pump 1 when a pump discharge pressure of the hydraulic pump 1 exceeds a preset pressure for the relief valve 4, while when the pump discharge pressure becomes the preset pressure or lower, the main relief valve 4 is set a closed state in such a manner that the relief valve 4 does not allow the passage. As to the port relief valves 5a and 5b, a description will be given later.

As shown in FIG. 2, the controller 15 includes an input unit 151, a first command unit (pressure feedback control means) 152, a second command unit (an example of ordinary control means) 153, a third command unit (another example of ordinary control means) 154, a selecting unit 155, an output unit 156, and a memory 157. A description will be given below about each of these elements. Reference will be made below to the case where plural types of ordinary control means are provided.

The input unit 151 inputs the discharge pressure (the pump discharge pressure) of the hydraulic pump 1 and the pressure on the upstream side of the main relief valve 4 both detected by the pressure sensor 9 and the pilot pressure detected by the pressure sensors 13a and 13b. The first command unit 152 issues a pump flow rate command so as to perform a pressure feedback control based on the inputted upstream-side pressure of the main relief valve 4. The second command unit 153 issues a pump flow rate command so as to perform a positive control based on the inputted pilot pressure. The third command unit 154 issues a pump flow rate command so as to perform a PQ control based on the inputted discharge pressure of the hydraulic pump 1. The selecting unit 155 compares the pump flow rate commands and selects a pump flow rate command corresponding to the smallest discharge flow rate of the hydraulic pump 1 (low-order selection) among the commands. The output unit 156 outputs the selected pump flow rate command to a regulator (not shown) in the hydraulic pump 1. The memory 157 is for storing various programs and data.

In this first embodiment, the discharge flow rate of the hydraulic pump 1 is adjusted in accordance with the outputted pump flow rate command, whereby the discharge pressure varies. As a result, the main relief valve 4 is controlled for opening or closing.

Figure 3:
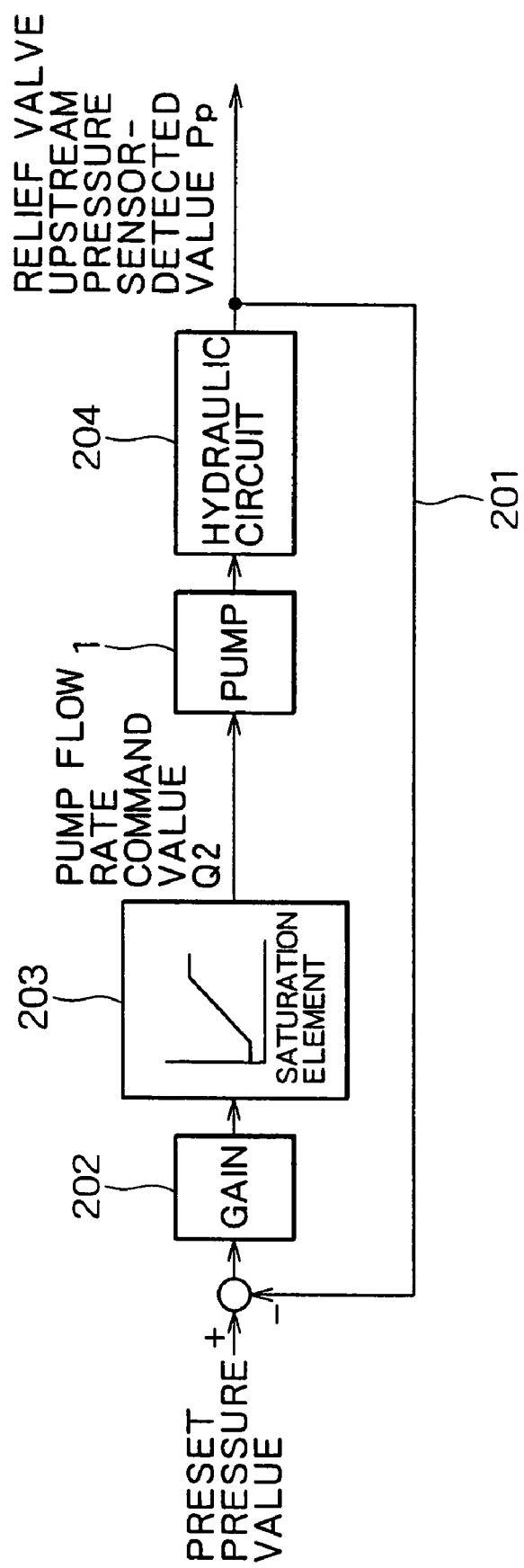
FIG. 3 is an explanatory diagram of a pressure feedback control.
Figure 4:
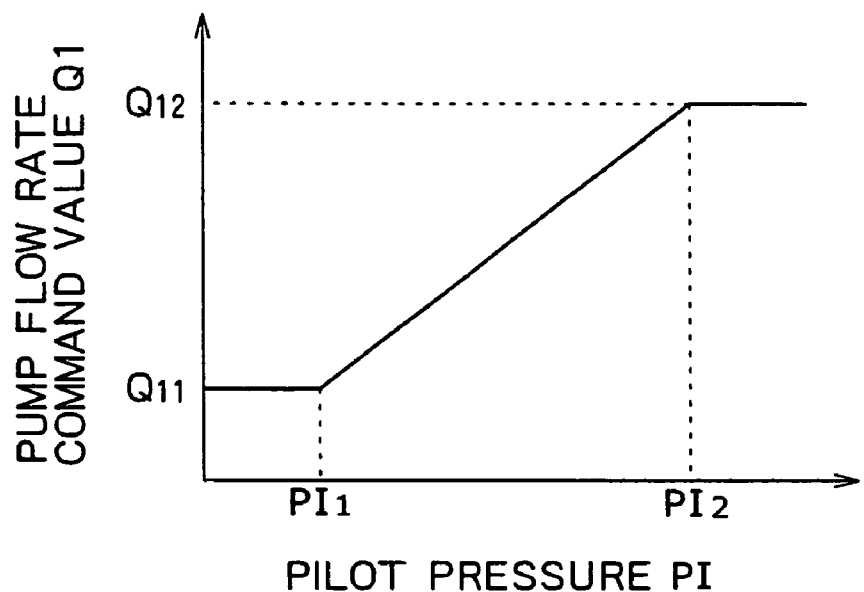
FIG. 4 is an explanatory diagram showing a relation between a pilot pressure and a pump flow rate command value in a positive control.
Figure 5:
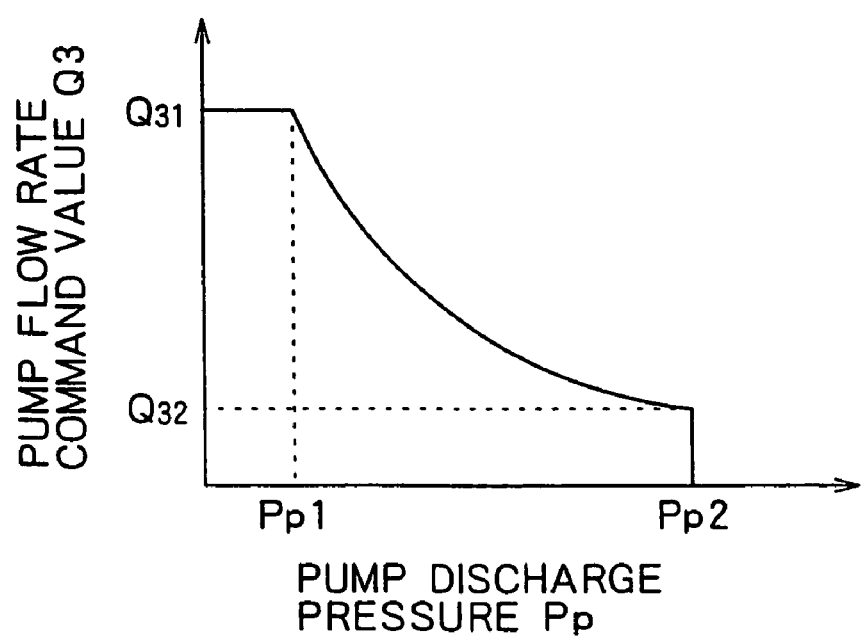
FIG. 5 is an explanatory diagram showing a relation between a pump discharge pressure and a pump flow rate command value in a PQ control.

FIG. 3 is an explanatory diagram of the pressure feedback control, FIG. 4 is an explanatory diagram showing a relation between the pilot pressure and a pump flow rate command value in the positive control, and FIG. 5 is an explanatory diagram showing a relation between the pump discharge pressure and a pump flow rate command value in the PQ control.

In the pressure feedback control performed by the first command unit 152 in the controller 15, there is used such a feedback system as shown in FIG. 3 which comprises a feedback loop 201, a control gain element 202, a saturation element 203, the hydraulic pump 1, and a hydraulic circuit (a hydraulic system) 204.

The input unit 151 inputs an upstream-side pressure Pp of the main relief valve 4 which is detected by the pressure sensor 9 (a detected value by the pressure sensor 9). Next, the first command unit 152 compares the inputted pressure Pp with a preset pressure value through the feedback loop 201 and thereby calculates a deviation. A control gain is given for that deviation by the control gain element 202 and thereafter a pump flow rate command value Q2 is determined using the saturation element 203.

In the positive control performed by the second command unit 153, the input unit 151 inputs the pilot pressure detected by the pressure sensors 13a and 13 and calculates a pump flow rate command value Q1 relative to the pilot pressure PI with use of such a relation (a positive control map) as shown in FIG. 4. Here, within the range of pilot pressure PI1 to PI2, pump flow rates Q11 and Q12 proportional thereto are calculated.

In the PQ control by the third command unit 154, the input unit 151 inputs the discharge pressure of the hydraulic pump 1 detected by the pressure sensor 9 and calculates a pump flow rate command value Q3 relative to the discharge pressure Pp with use of such a relation (a PQ control map) as shown in FIG. 5. Here, within the range of discharge pressure Pp1 to Pp2, pump flow rate command values Q31 and Q32 inversely proportional thereto are calculated.

The pressure sensor 9 is a sensor for detecting the upstream-side pressure of the main relief valve 4 and also a sensor for detecting a pump pressure detecting sensor. However, two sensors may be provided separately.

Figure 6:
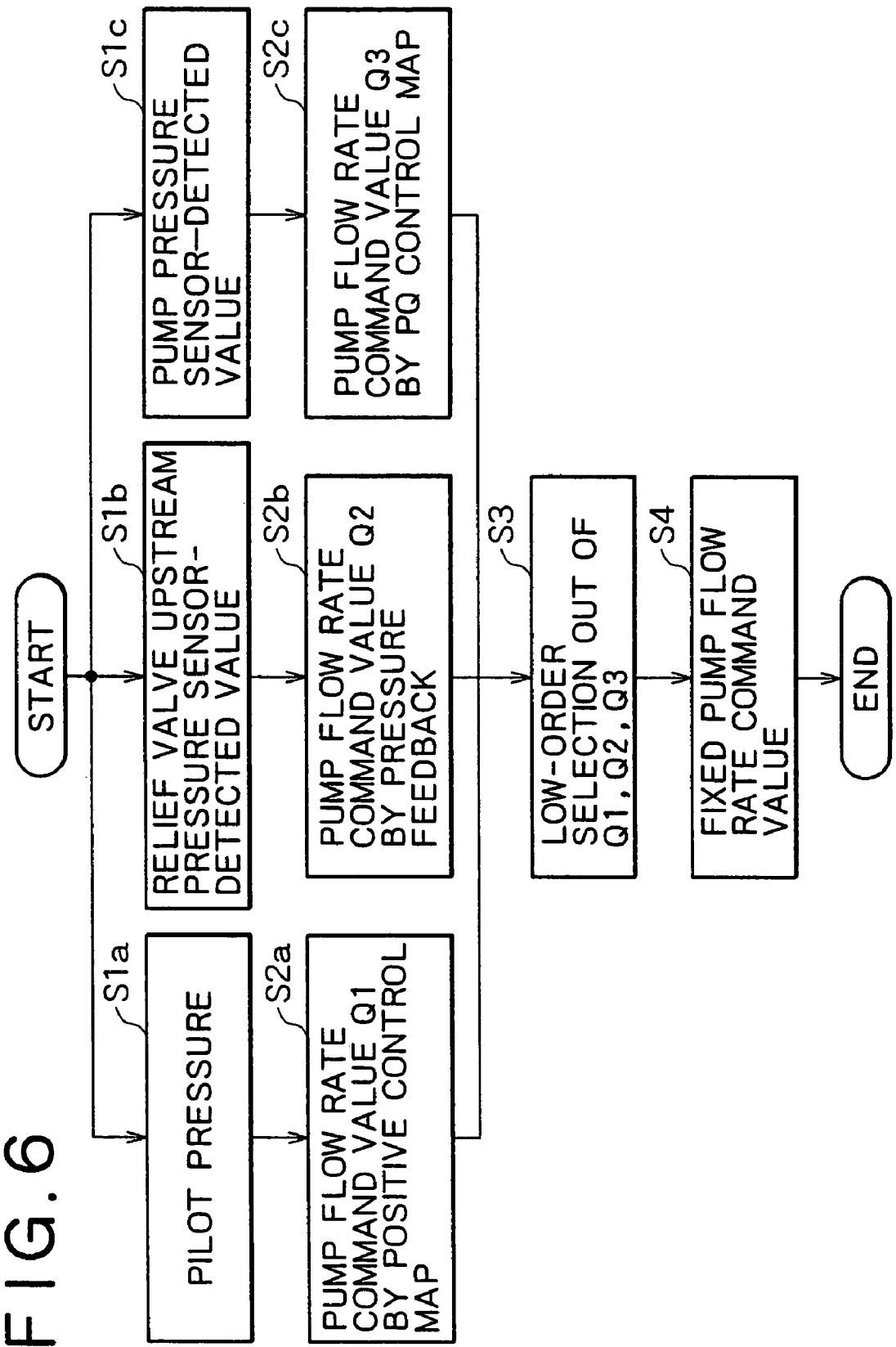
FIG. 6 is a flow chart showing the operation of the first embodiment.

FIG. 6 is a flow chart showing operations of the controller 15.

In the same figure, when the input unit 151 inputs detected values from the sensors (steps S1a, S1b, S1c), the pump flow rate command value Q1 in the positive control by the second command unit 153, the pump flow rate command value Q2 in the pressure feedback control by the first command unit 152, and the pump flow rate command value Q3 in the PQ control by the third command unit 154, are calculated by the above methods (steps S2a, S2b, S2c). Next, a low-order selection is made in the selecting unit 155 among each of the pump flow rate command values Q1, Q2 and Q3 to determine a fixed pump flow rate command value (step S3). Then, the fixed value (the fixed pump flow rate command value) is outputted from the output unit 156 to the hydraulic pump 1 (step S4).

The regulator (not shown) in the hydraulic pump 1 adjusts the pump flow rate in accordance with the outputted fixed value. A pressure-flow rate relating to time response is shown in FIGS. 7A to 7G.

Figure 7A:
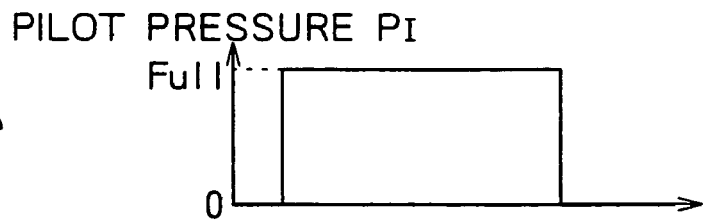
FIGS. 7A to 7G are explanatory diagrams showing a pressure-flow rate response relation in the hydraulic control system of the first embodiment, which each lateral axis of FIGS. 7A-7G indicates time.
Figure 7B:
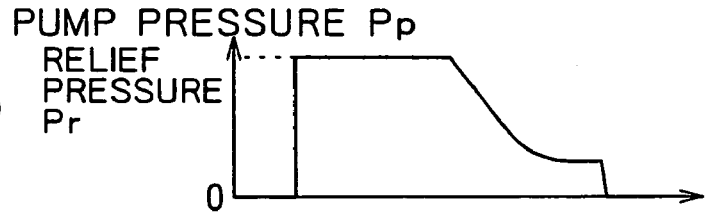
Figure 7C:
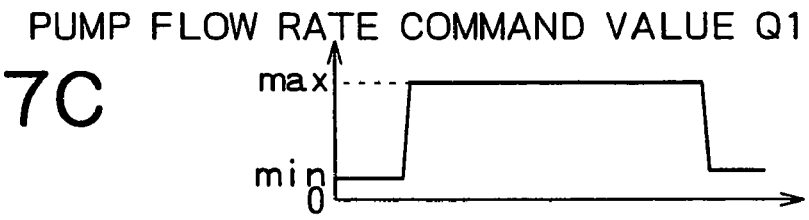
Figure 7D:
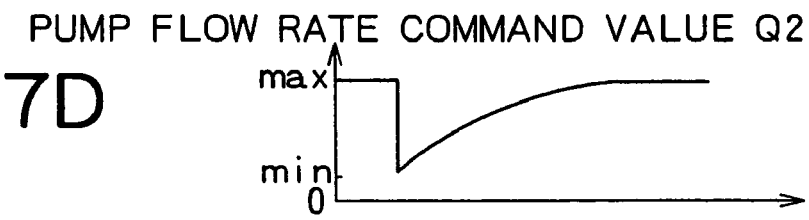
Figure 7E:
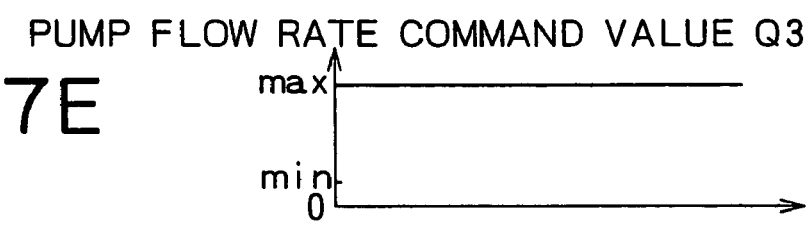
Figure 7F:
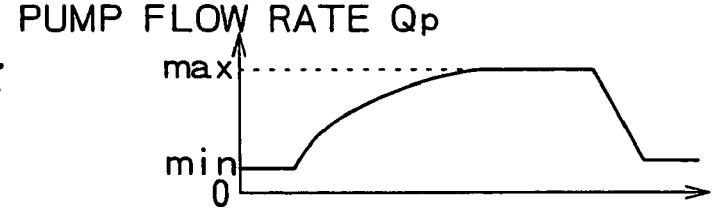

In this first embodiment, when the pilot pressure PI is set to FULL stepwise as shown in FIG. 7A, the pump flow rate command value Q1 calculated in the positive control becomes maximum stepwise as in THE RELATED ART, as shown in FIG. 7C, and the pump pressure Pp also rises to a relief pressure Pr as in FIG. 7B. In this first embodiment, however, the detected value on the upstream side of the main relief valve 4, which is detected by the pressure sensor 9, also rises, so that the pump flow rate command value Q2 in the pressure feedback control decreases to near the minimum flow rate as in FIG. 7D.

On the other hand, the PQ control is for cutting off the pump flow rate under a high load in an excavating work or the like. For example in a swing or rotating operation performed in the air, the pump flow rate command value Q3 exhibits the maximum flow rate as in FIG. 7E. Since the fixed pump flow rate command value is determined by the low-order selection out of Q1, Q2 and Q3 as described above, the pump flow rate command value Q2 is here selected and the pump flow rate Qp decreases to near the minimum flow rate as in FIG. 7F.

Figure 7G:
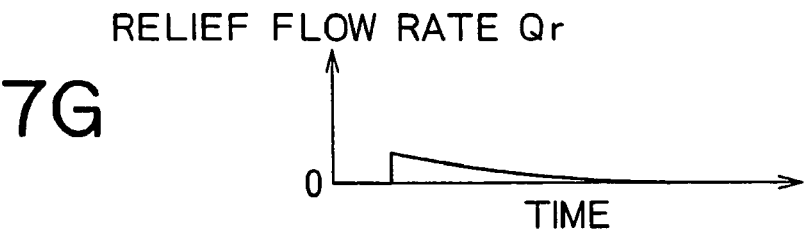
Figure 13A:
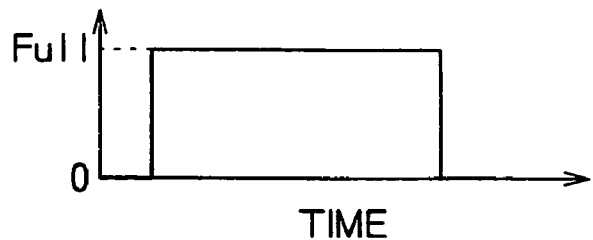
FIGS. 13A to 13D are explanatory diagrams showing a pressure-flow rate response relation observed when the positive control referred to in THE RELATED ART is performed.
Figure 13B:
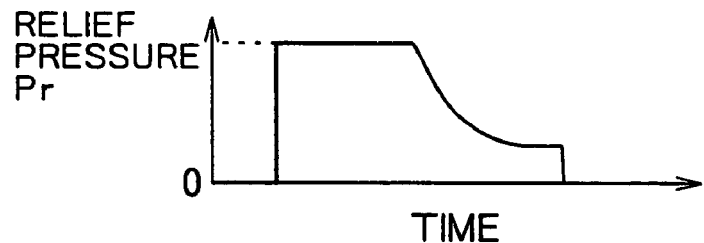
Figure 13C:
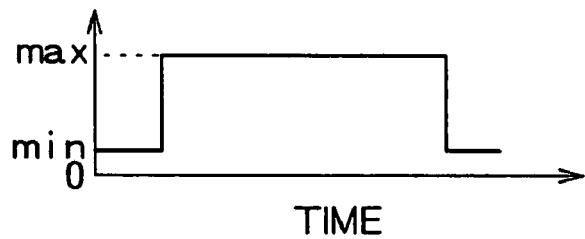
Figure 13D:
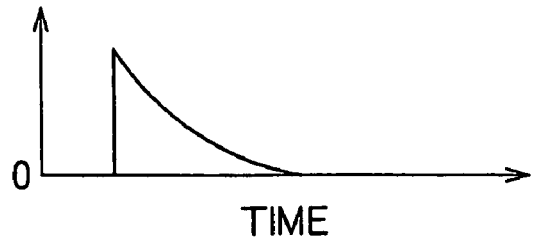

Consequently, an incoming flow rate and an outgoing flow rate for a supply-side pipe in the hydraulic motor 2 become almost equal to each other. Accordingly, the relief flow rate Qr becomes as shown in FIG. 7G, which is a great decrease in comparison with that shown in FIG. 13D and referred to in THE RELATED ART. As a result, the loss in the main relief valve 4 decreases and the energy saving performance of the machine is improved remarkably. Further, when the operating lever 11 is returned from FULL to NEUTRAL, the flow rate command value Q1 in the positive control decreases to the minimum flow rate as in FIG. 7C. Accordingly, the flow rate command value Q1 in the positive control is selected by the low-order selection and the pump flow rate Qp decreases as in FIG. 7F. Therefore, in the case where the pressure feedback control alone is performed, the pump pressure Pp is increased up to a preset pressure even with the operating lever 11 lying in NEUTRAL. As a result, the pump flow rate Qp increases and the relief flow rate Qr occurs. However, by adopting this method it is possible to eliminate the problem of the increase in pump flow rate Qp and relief pressure Pr with the operating lever 11 lying in NEUTRAL.

Also in negative control and load sensing control other than the above positive control, there can be obtained the same effects as above.

Figure 8:
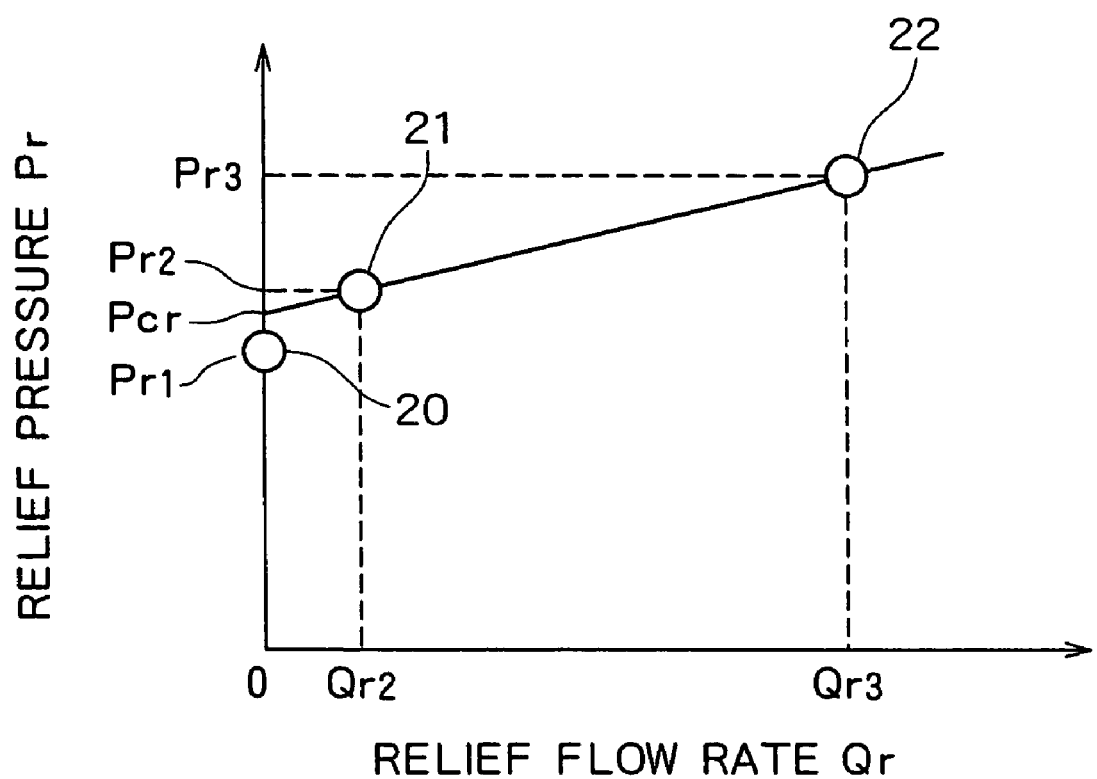
FIG. 8 is an explanatory diagram showing a relation between a relief flow rate and a relief pressure in a main relief valve.

FIG. 8 shows an override characteristic of the main relief valve, from which it is seen that the relief pressure Pr tends to rise as the relief flow rate Qr increases. Numeral 20 represents a point corresponding to a preset pressure value of Pr1 in the pressure feedback control, which value is smaller than a cracking pressure Pcr of the main relief valve 4. In this case, the relief flow rate Qr becomes zero, so that there is no relief loss and a maximum energy saving effect can be obtained.

Thus, the relief flow rate become zero when the predetermined pump discharge pressure is not higher than the cracking pressure of the relief valve.

However, since the maximum value of the relief flow rate Qr becomes Qr3 and in view of the override characteristic of the main relief valve 4, Pr3 (point 22) is set as an ordinary preset pressure value, while the preset pressure value at the point 20 referred to above becomes as low as Pr1. Consequently, the acceleration performance and the hill climbing ability are somewhat deteriorated.

On the other hand, numeral 21 represents a point corresponding to a preset pressure value of Pr2 in the pressure feedback control, which pressure is somewhat higher than the cracking pressure Pcr. In this case, the maximum value of the relief flow rate Qr becomes not zero but Qr2. Consequently, the energy saving effect becomes lower than at point 20, but the pressure decrease amount becomes smaller than at point 20. Hence it is possible to ensure satisfactory acceleration performance and hill climbing ability.

Thus, in the case where the predetermined pump discharge pressure is set at a value between the maximum relief pressure of the relief valve and the cracking pressure, it is possible to increase and the discharge pressure of the hydraulic pump 1 and ensure satisfactory acceleration performance and hill climbing ability.

Therefore, it is preferable that the above preset pressure value be determined in accordance with the performance required for the working machine.

Although the main relief valve 4 has been described in the above first embodiment, reference will be made in the following second embodiment to the port relief valves 5a and 5b as another example of the relief mechanism.

Second Embodiment

Figure 9:
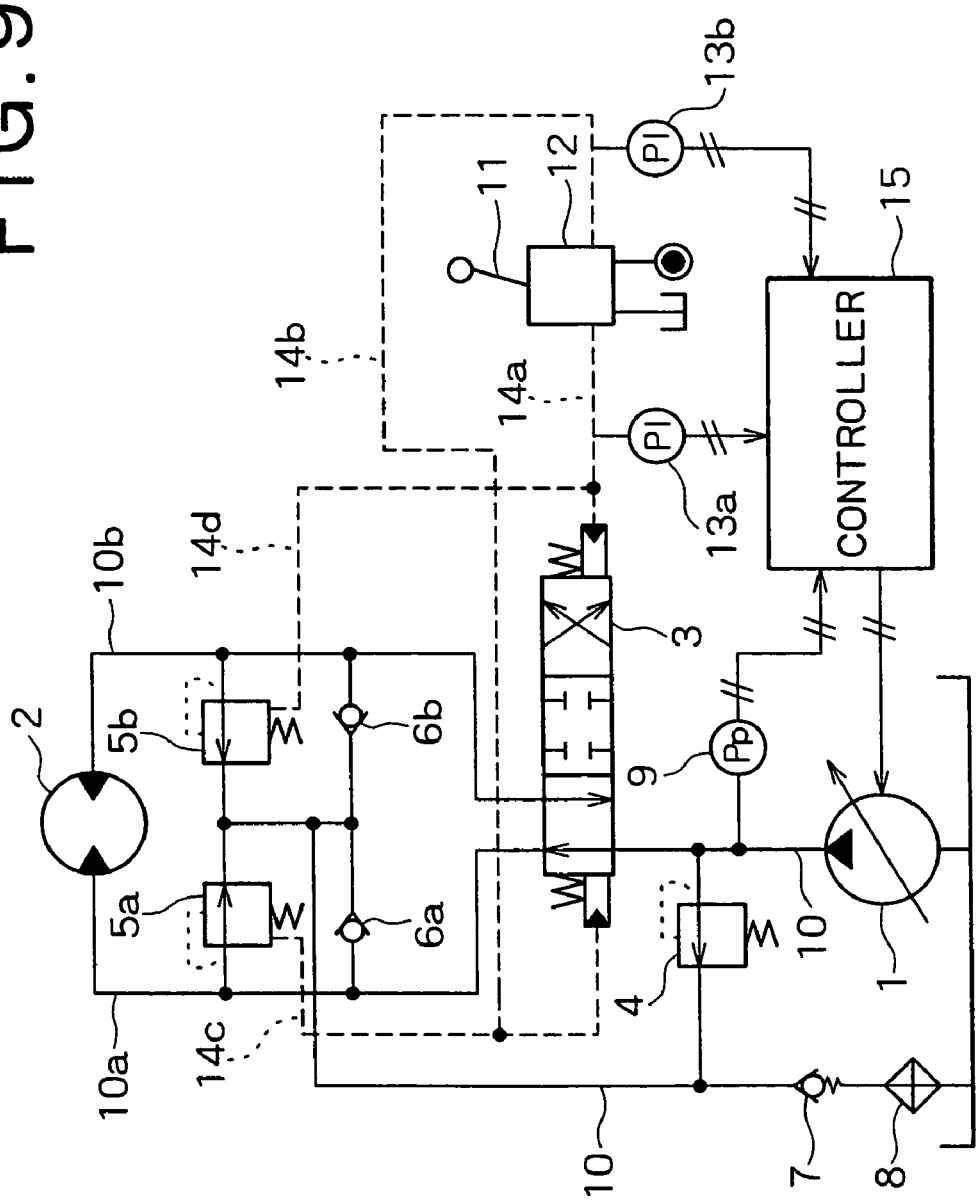
FIG. 9 illustrates a hydraulic control system for a working machine according to a second embodiment of the present invention.
Figure 10:
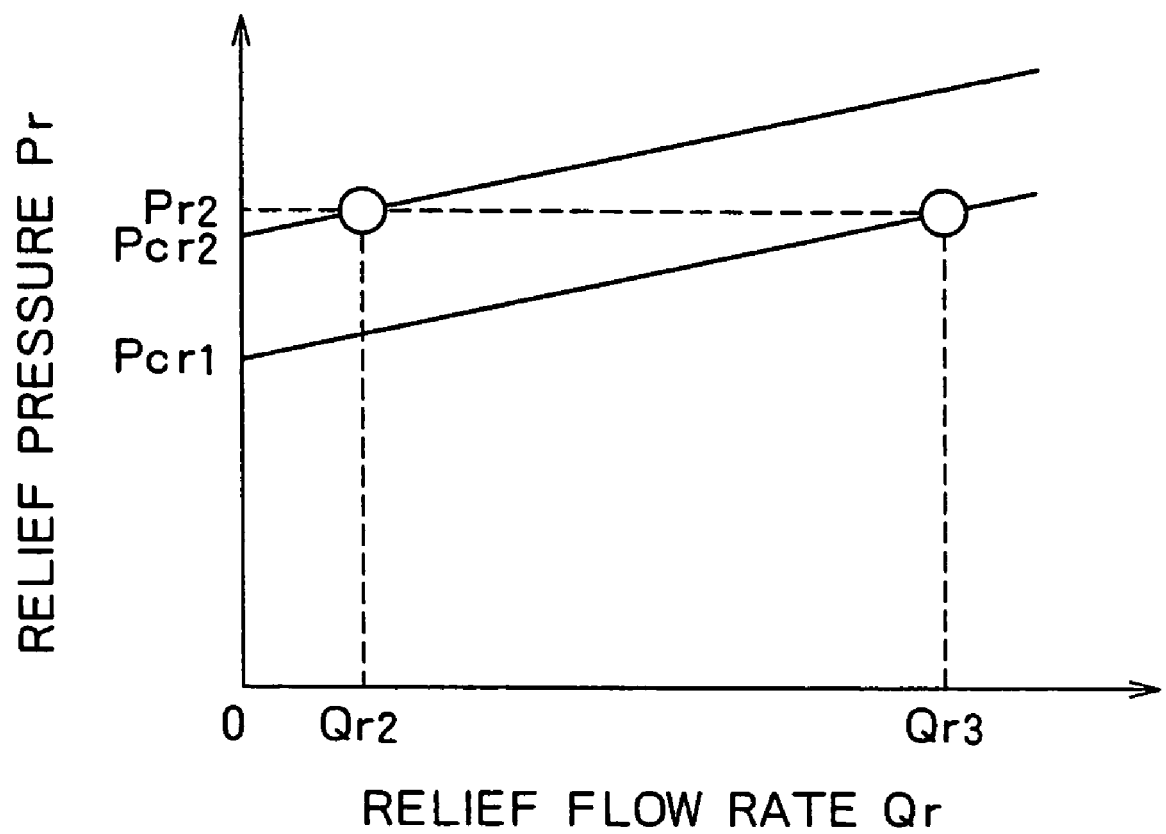
FIG. 10 is an explanatory diagram showing a relation between a relief flow rate and a relief pressure in a port relief valve.

FIG. 9 illustrates a hydraulic control system for a working machine according to a second embodiment of the present invention and FIG. 10 is an explanatory diagram showing a pressure-flow rate response relation in the port relief valves. In this second embodiment, elements common to the first embodiment are identified by the same reference numerals as in the first embodiment and tautological explanations thereof will be omitted.

In the hydraulic control system of this second embodiment, as shown in FIG. 9, pilot lines 14a and 14b are branched to provide pilot lines 14c and 14d communicating with spring chambers of the port relief valves 5a and 5b. The operation of this system configuration will be described below.

FIG. 9 shows a state in which a pilot pressure is developed on the pilot line 14a by operation of the operating lever 11, and with the control valve 3 switched to the right side, the main line 10a becomes a working oil supply side and the main line 10b becomes a working oil discharge side.

In this case, during acceleration of the hydraulic motor 2, the port relief valve 5a operates, but the pilot pressure is introduced into the spring chamber of the port relief valve 5a through the pilot line 14c. Consequently, the cracking pressure of the port relief valve 5a increases from Pr1 to Pr2, as shown in FIG. 10. According to the ordinary characteristic, therefore, a large relief flow rate Qr3 is developed and the relief pressure becomes Pr3.

However, according to the characteristic of this second embodiment, even when control is made so that the maximum value of the relief flow rate Qr decreases to Qr2, the relief pressure becomes Pr3 as a result of an increase of the cracking pressure to Pcr2.

Thus, during acceleration of the hydraulic actuator, the cracking pressure of the relief valve increases, while during deceleration of the hydraulic actuator, the cracking pressure of the relief valve decreases. Consequently, the discharge pressure of the hydraulic pump 1 rises and it is possible to keep the pressure on the supply side of the hydraulic actuator high, whereby the acceleration performance and the hill climbing ability are improved. On the other hand, during deceleration of the hydraulic actuator, since the cracking pressure decreases, the discharge pressure of the hydraulic pump 1 decreases and so does the pressure on the supply side of the hydraulic actuator. As a result, there is no longer likelihood of an excessive torque being exerted on a swing decelerator, causing damage thereof.

Thus, as described in the first embodiment, it is possible to eliminate the problem that the pressure decreases by decreasing the relief flow rate Qr, leading to deterioration of the acceleration performance and the hill climbing ability.

Such an effect attained by a change in cracking pressure can also be obtained if electromagnetically variable relief valves are used as the port relief valves 5a and 5b and the cracking pressure is controlled by the controller 15.

If changing the preset pressure value in the pressure feedback control in the first and second embodiments is considered to be troublesome, the following embodiments may be effective as countermeasures. In the following third and fourth embodiments, switching to a different mode of a preset pressure value can be done manually or automatically.

Third Embodiment

Figure 11:
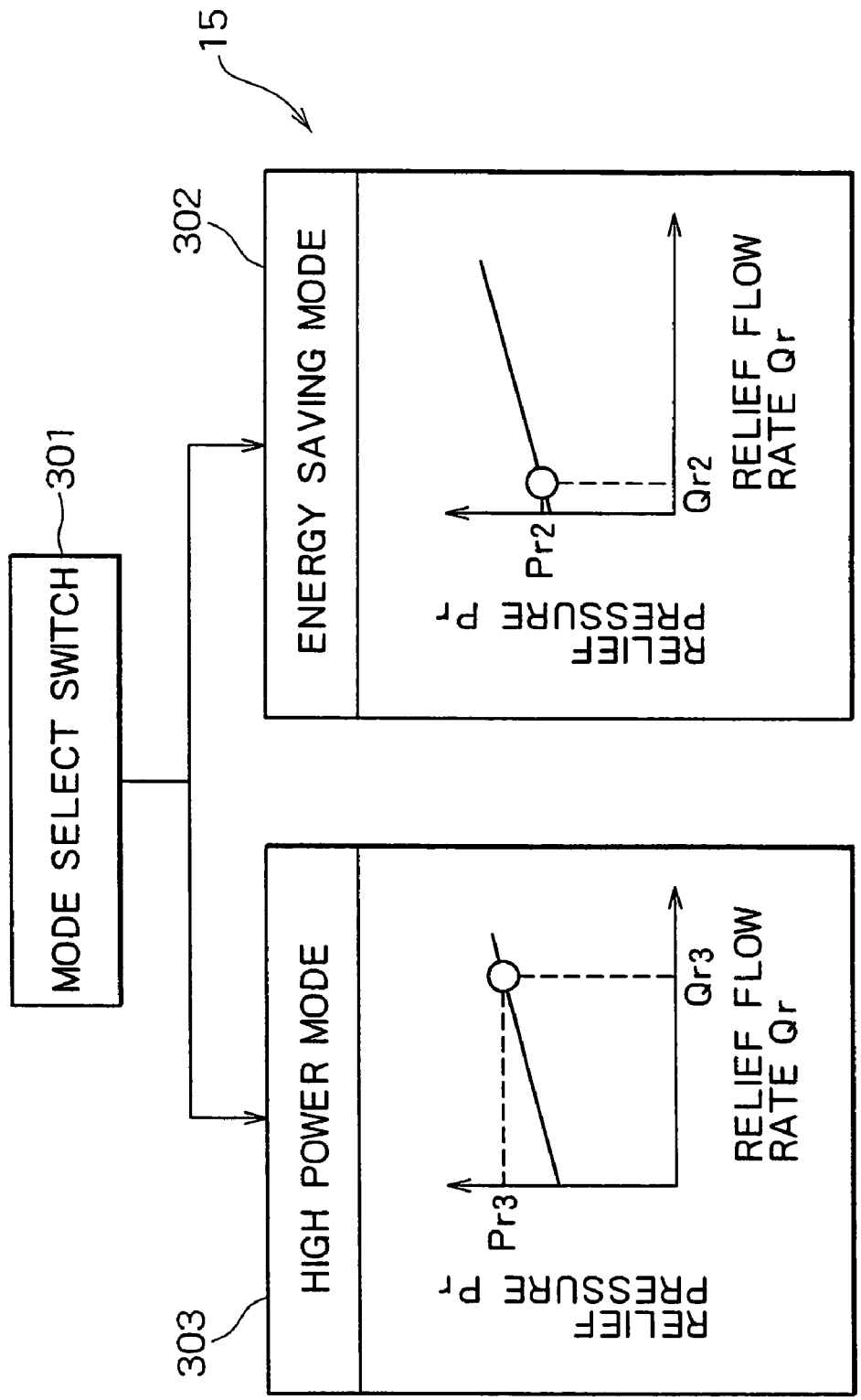
FIG. 11 is an explanatory diagram showing a control method using mode switching according to a third embodiment of the present invention.

FIG. 11 is an explanatory diagram showing a control method using mode switching.

In a controller 15 according to this third embodiment, it is possible to make an ON/OFF selection in the pressure feedback control by the first command unit 152. As shown in FIG. 11, the controller 15 includes an energy saving mode processing unit 302 for the execution of processing in an energy saving mode (first mode), a high power mode processing unit 303 for the execution of processing in a high power mode (second mode), and a mode select switch 301 for switching a mode to the other mode. Other elements are the same as in the first and second embodiments.

The energy saving mode processing unit 302, upon receipt of a switching signal from the mode select switch 301, provides a command signal for ON selection of the pressure feedback control to the first command unit 152.

The high power mode processing unit 303, upon receipt of a switching signal from the mode select switch 301, provides a command signal for OFF selection of the pressure feedback control to the first command unit 152.

When a user switches the mode select switch 301 to the energy saving mode side, the energy saving mode processing unit 302, upon receipt of the switching signal indicative of that switching, provides a command signal for ON selection of the pressure feedback control to the first command unit 152. Then, the first command unit 152 turns ON the pressure feedback control and, as described in the first embodiment, the selecting unit 155 makes a low-order selection for pump flow rate commands in the positive control by the second command unit 153, the pressure feedback control by the first command unit 152 and the PQ control by the third command unit 154. Then, the selected pump flow rate command is issued from the output unit 156 to the hydraulic pump 1, whereby the discharge pressure of the hydraulic pump 1 changes. As a result, the maximum value of the relief flow rate Qr in the main relief valve is suppressed to Qr2 (the relief pressure Pr is Pr2 at this time) and thus an energy saving effect is obtained.

On the other hand, when the user switches the mode select switch 301 to the high power mode side, the high power mode processing unit 303, upon receipt of the switching signal indicative of that switching, issues a command signal for OFF selection of the pressure feedback control to the first command unit 152. Then, the first command unit 152 turns OFF the pressure feedback control and the selecting unit 155 makes a low-order selection for both pump flow rate commands in the positive control by the second command unit 153 and the PQ control by the third command unit 154, then the selected pump flow rate command is issued from the output unit 156 to the hydraulic pump 1, whereby the discharge pressure of the hydraulic pump 1 changes. As a result, the maximum value of the relief flow rate Qr in the main relief valve becomes Qr3 and the relief pressure Pr becomes Pr3. Consequently, although the energy saving effect becomes lower, the pressure rises and it becomes possible to make control affording high acceleration performance and hill climbing ability.

Thus, plural types of ordinary control means are provided and the pressure feedback control means is turned ON when switching is made to the energy saving mode as the first mode by the mode select switch, while when switching is made to the high power mode as the second mode, the pressure feedback control means is turned OFF. Therefore, in the first mode, energy saving can be attained by making a cut-off flow rate high, while in the second mode, the acceleration performance and hill climbing ability can be enhanced by making the cut-off flow rate low or zero.

In this case, the same effect as above can also be obtained even by setting a low pressure value for the pressure feedback control in the energy saving mode, by setting a high pressure value for the pressure feedback control in the high power mode or by making the control gain low to turn the feedback control substantially OFF.

Fourth Embodiment

Figure 12:
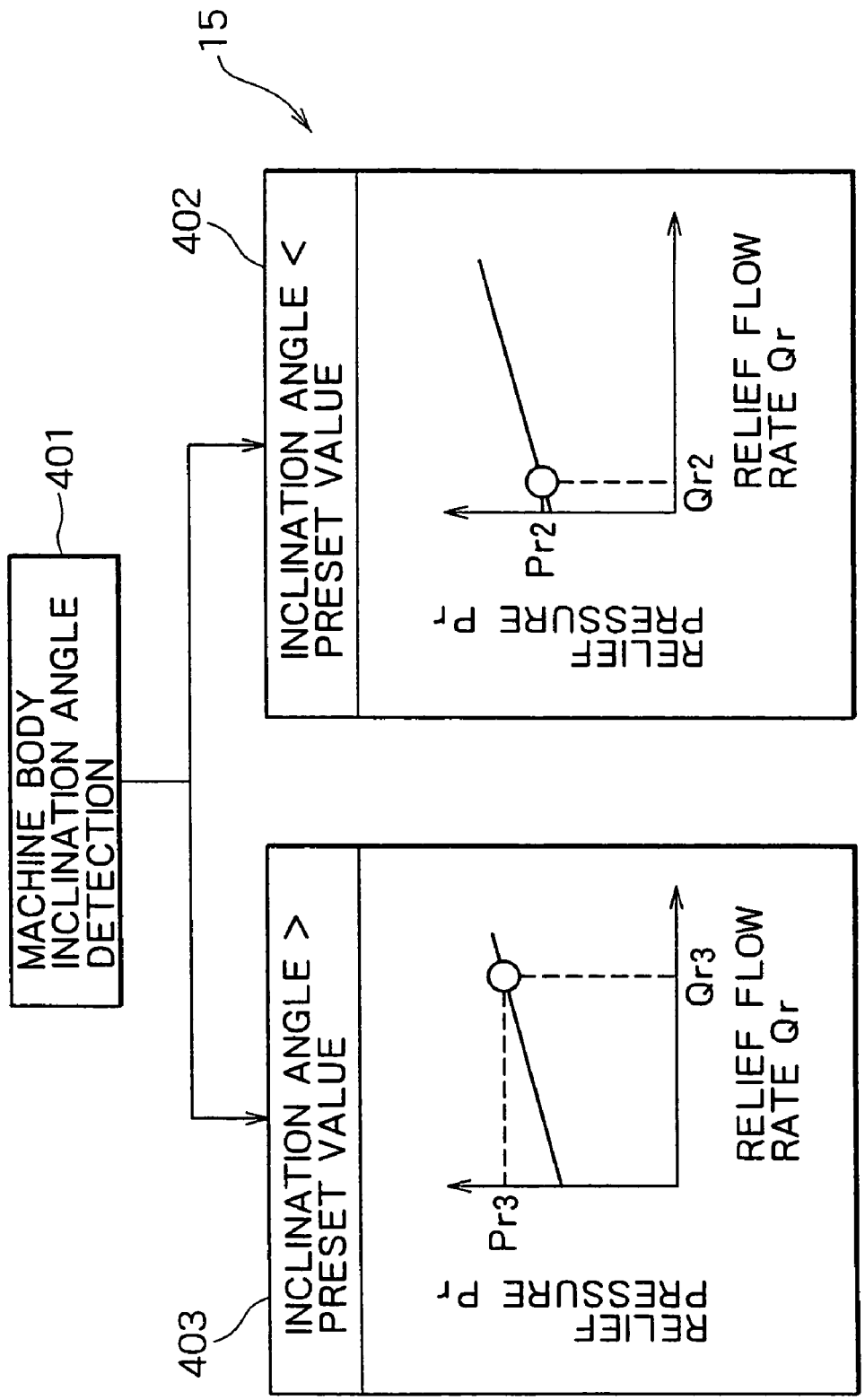
FIG. 12 is an explanatory diagram showing a control method using a main body inclination angle according to a fourth embodiment of the present invention.

FIG. 12 is an explanatory diagram showing a control method using a main body inclination angle.

In a controller 15 according to this fourth embodiment, the pressure feedback control by the first command unit 152 can be made ON and OFF. As shown in FIG. 12, an inclination angle sensor (angle detecting means) 401 for detecting a main body of the machine (machine body) inclination angle is provided in place of the mode select switch 301 used in the third embodiment. The input unit 151 inputs this detected value, then compares the inclination angle with the preset value, and on the basis of the result of the comparison, automatically selects a low inclination angle mode processing unit 402 for processing in a low inclination angle mode (first mode) or a high inclination angle mode processing unit 403 for processing in a high inclination angle mode.

In the controller 15 according to this fourth embodiment, it is possible to make an ON/OFF selection in the pressure feedback control by the first command unit 152. As shown in FIG. 12, the controller 15 includes the inclination angle sensor (angle detecting means) 401 for detecting a main body inclination angle, the low inclination angle mode processing unit 402 for processing in a low inclination angle mode (first mode) wherein the main body inclination angle is not larger than a preset value, and the high inclination angle mode processing unit 403 for processing in a high inclination angle mode (second mode) wherein the main body inclination angle is the preset value or larger.

Other elements used in this fourth embodiment are the same as in the third embodiment. Input of the main body inclination angle detected by the inclination angle sensor 141 and comparing the inputted main body inclination angle with the preset value are performed, for example, by the input unit 151.

When the main body inclination angle detected by the inclination angle sensor 401 is not larger than the preset value, the low inclination angle mode processing unit 402 issues a command signal for ON selection of the pressure feedback control to the first command unit 152.

When the main body inclination angle detected by the inclination angle sensor 401 exceeds the preset value, the high inclination angle mode processing unit 403 issues a command signal for OFF selection of the pressure feedback control to the first command unit 152.

When the main body inclination angle detected by the inclination angle sensor 401 is not larger than the preset value, the low inclination angle mode processing unit 402 issues a command signal for ON selection of the pressure feedback control to the first command unit 152. In accordance with the command signal, the first command unit 152 turns ON the pressure feedback control. Then, as described in the first embodiment, the selecting unit 155 makes a low-order selection for pump flow rate commands in the positive control by the second command unit 153, the pressure feedback control by the first command unit 152 and the PQ control by the third command unit 154 and the selected pump flow rate command is issued from the output unit 156 to the hydraulic pump 1. Thus, the discharge pressure of the hydraulic pump 1 varies. As a result, in the case where the main body is placed on a level ground, the maximum value of the relief flow rate Qr in the main relief valve is suppressed to Qr2 (the relief pressure Pr is Pr2 at this time) and thus an energy saving effect is obtained.

On the other hand, when the main body inclination angle detected by the inclination angle sensor 401 exceeds the preset value, the high inclination angle mode processing unit 403 issues a command signal for OFF selection of the pressure feedback control to the first command unit 152. In accordance with the command signal, the first command unit 152 turns OFF the pressure feedback control. Further, the selecting unit 155 makes a low-order selection for both pump flow rate commands in the positive control by the second command unit 153 and the PQ control by the third command unit 154 and the selected pump flow rate command is issued from the output unit 156 to the hydraulic pump 1. Thus, the discharge pressure of the hydraulic pump 1 varies. As a result, the maximum value of the relief flow rate Qr in the main relief valve becomes Qr3 and the relief pressure Pr becomes Pr3. Therefore, the pressure rises and it becomes possible to make control affording a high hill climbing ability although the energy saving effect becomes lower.

There may be adopted a configuration wherein the inclination angle sensor 401 is provided as an angle detecting means for detecting an inclination angle of the main body and the pressure feedback control means is turned ON when the inclination angle is not larger than a preset value and is turned OFF when the inclination angle exceeds the preset value.

According to this configuration, on a level ground, the energy saving can be attained by making the cut-off flow rate large. Further, on an uphill road, the hill climbing ability can be enhanced by making the cut-off flow rate small or zero.

In this case, the same effect can be obtained by setting a low pressure value for the pressure feedback control in the low inclination angle mode, by making the control gain high to set a high pressure value for the pressure feedback control in the high inclination angle mode, or by making the control gain low to bring the pressure feedback control into a substantially OFF condition.

In the control performed by the ordinary control means, there are included positive control, negative control and load sensing control. In the first to fourth embodiments described above, although it is the positive control and the PQ control that are performed by the ordinary control means, other types of controls may be applied and the number of the types is not limited.

Although the invention has been described with reference to the preferred embodiments in the attached figures, it is noted that equivalents may be employed and substitutions made herein without departing from the scope of the invention as recited in the claims.

I claim:

1. A hydraulic control system for a working machine, comprising:
   a hydraulic actuator;
   a hydraulic pump for supplying working oil to said hydraulic actuator through a control valve;

means for supplying a pilot pressure to the control valve;

a relief mechanism disposed on the discharge side of said hydraulic pump, said relief mechanism is set to an open state in such a manner that said relief mechanism allows a passage of said working oil from said hydraulic pump when a pump discharge pressure of said hydraulic pump which varies according to a pump flow rate in said hydraulic pump exceeds a predetermined pressure and is set to a closed state in such a manner that said relief mechanism does not allow the passage when said pump discharge pressure becomes the predetermined pressure or lower;

an ordinary control means for controlling said pump flow rate in accordance with said pilot pressure;

a pressure feedback control means for controlling said pump flow rate in accordance with a comparison of said pump discharge pressure with a preset pressure value;

a PQ control means for controlling said pump flow rate inversely to said pump discharge pressure;

and selecting means for selecting a pump flow rate based on a smaller one of the pump flow rates controlled by said ordinary control means, said pressure feedback control means and said PQ control means.

2. The hydraulic control system for a working machine according to claim 1, wherein said relief mechanism is a relief valve.

3. The hydraulic control system for a working machine according to claim 1, wherein said relief mechanism is a relief valve configured such that a cracking pressure of said relief valve rises during acceleration of said hydraulic actuator and lowers during deceleration of said hydraulic actuator in accordance with said pilot pressure.

4. A hydraulic control system for a working machine, comprising:

a hydraulic actuator;

a hydraulic pump for supplying working oil to said hydraulic actuator through a control valve;

a relief mechanism disposed on the discharge side of said hydraulic pump, said relief mechanism is set to an open state in such a manner that said relief mechanism allows a passage of said working oil from said hydraulic pump when a pump discharge pressure of said hydraulic pump which varies according to a pump flow rate in said hydraulic pump exceeds a predetermined pressure and is set to a closed state in such a manner that said relief mechanism does not allow the passage when said pump discharge pressure becomes the predetermined pressure or lower;

an ordinary control means for controlling said pump flow rate in accordance with working information;

a pressure feedback control means for controlling said pump flow rate in accordance with said pump discharge pressure;

and selecting means for selecting a pump flow rate based on a smaller one of the pump flow rates controlled by said ordinary control means and said pressure feedback control means, wherein controlling performed by said ordinary control means comprises plural types of controls, a mode select switch for switching between first and second modes of said selecting means, wherein one of said ordinary control means and said pressure feedback control means may be selected by said selecting means when switching is made to said first mode by said mode select switch, and wherein said pressure feedback control means may not be selected by said selecting means and said ordinary control means may be selected when switching is made to said second mode by said mode select switch.

5. A hydraulic control system for a working machine, comprising:

a hydraulic actuator;

a hydraulic pump for supplying working oil to said hydraulic actuator through a control valve;

a relief mechanism disposed on the discharge side of said hydraulic pump, said relief mechanism is set to an open state in such a manner that said relief mechanism allows a passage of said working oil from said hydraulic pump when a pump discharge pressure of said hydraulic pump which varies according to a pump flow rate in said hydraulic pump exceeds a predetermined pressure and is set to a closed state in such a manner that said relief mechanism does not allow the passage when said pump discharge pressure becomes the predetermined pressure or lower;

an ordinary control means for controlling said pump flow rate in accordance with working information;

a pressure feedback control means for controlling said pump flow rate in accordance with said pump discharge pressure;

and selecting means for selecting a pump flow rate based on a smaller one of the pump flow rates controlled by said ordinary control means and said pressure feedback control means, wherein controlling performed by said ordinary control means comprises plural types of controls and wherein said selecting means may turn off selection of said pressure feedback control means, an angle detecting means for detecting an inclination angle of a main body of the machine, and wherein said pressure feedback control means is turned on when an inclination angle detected by said angle detecting means is not larger than a preset value and is turned off when said inclination angle exceeds the preset value.

* * * * *